Nov. 12, 1968 J. A. DEAN 3,411,031

TRANSISTOR DEFLECTION CIRCUIT

Filed March 21, 1967

INVENTOR
Jack A. Dean

BY Eugene M. Whitacre
ATTORNEY 3,411,031

TRANSISTOR DEFLECTION CIRCUIT

Jack A. Dean, Flemington, N.J., assignor to Radio Corporation of America, a corporation of Delaware Filed Mar. 21, 1967, Ser. No. 624,775
14 Claims. (Cl. 315—27)

ABSTRACT OF THE DISCLOSURE

A television vertical deflection circuit comprising a transistor oscillator stage and a pentode electron tube output stage. A resistance-capacitance sawtooth generating circuit is coupled to the input of the electron tube. A further resistance-capacitance network including a diode is coupled in a feedback arrangement between the output and input of the electron tube and develops a feedback voltage which is added to the sawtooth for vertical linearity and vertical size control. Compensation is provided for supply voltage variations.

This invention relates to electromagnetic cathode ray beam deflection circuits of the type employed in television receivers and, in particular, to vertical deflection circuits for use in such apparatus.

Television deflection circuits are generally provided with height, linearity and hold or frequency controls for adjustment of the vertical scanning raster produced on the television image-reproducing device. In many such circuits, these several controls interact rendering it difficult for the viewer to properly adjust such controls. Furthermore, in many such prior circuits transient variations in line voltage or other variations due to aging of components (particularly electron tubes) adversely affect and cause variations in the linearity, height and frequency of the scanning raster so as to disturb the viewer's enjoyment.

In accordance with the present invention, a vertical deflection circuit for a television receiver is provided wherein effects of the operating controls are relatively independent of one another, and furthermore, the effects of component and supply voltage variations on the operation of the circuit are substantially reduced.

In a particular embodiment of the invention, a sawtooth waveform generating circuit is coupled to the input of an electron tube amplifying device. The amplifying device is in turn coupled to electromagnetic vertical deflection means. A feedback network including a capacitor is coupled between the output and input of the amplifying device for providing variable linearity and height corrections to the input sawtooth waveform.

Figure 1:
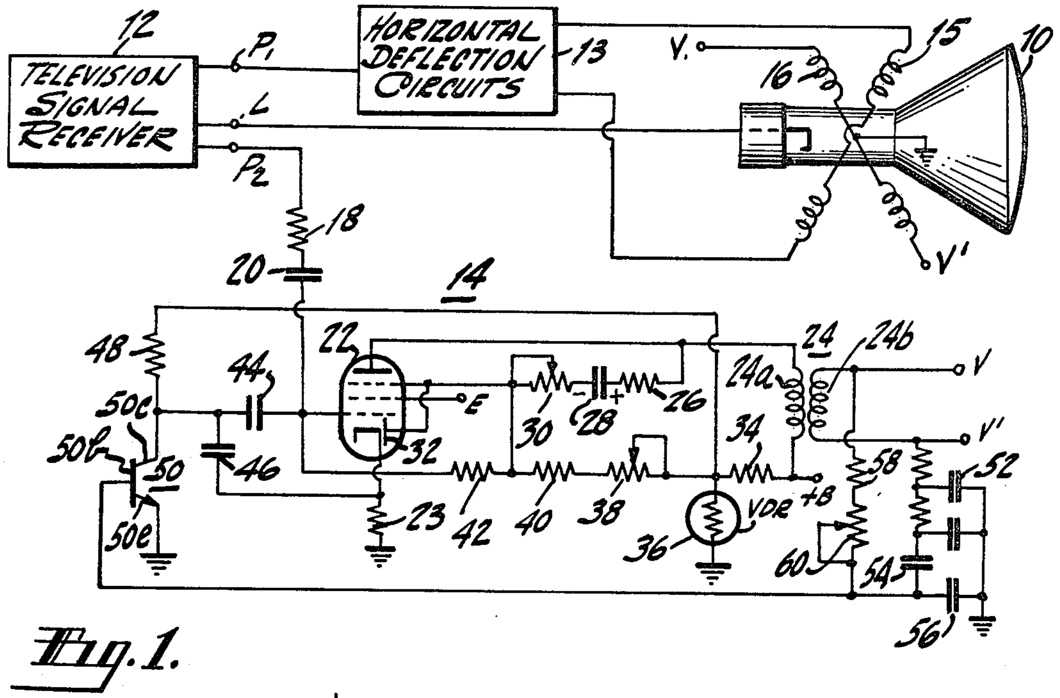
Figure 2:
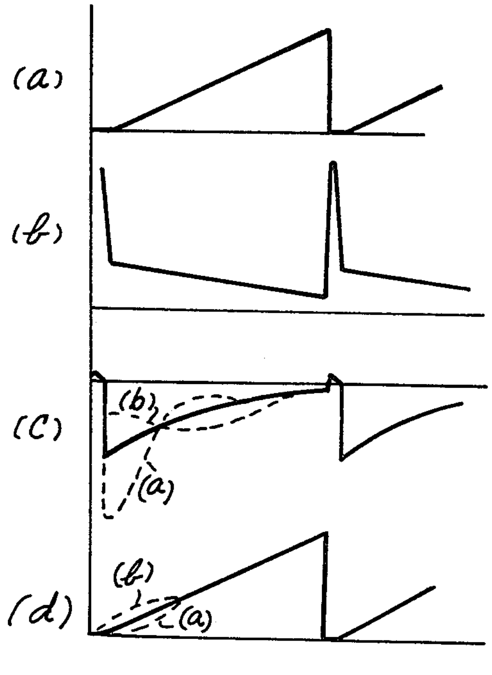

The novel features that are considered characteristic of this invention are set forth with particularity in the appended claims. The invention itself, however, both as to its organization and method of operation as well as additional objects thereof will best be understood from the following description when read in connection with the accompanying drawing, in which:

FIGURE 1 is a schematic circuit diagram partially in block form, of a television receiver including a particular embodiment of the present invention; and FIGURE 2 is a series of waveform diagrams which will be utilized in explaining the operation of the circuit shown in FIGURE 1.

In FIGURE 1, the bulk of the circuits of a television receiver serving to provide signals for energizing an image-reproducing device such as a kinescope 10 are represented by a single block 12 labelled "Television Signal Receiver." The receiver unit 12 incorporates the usual elements required to provide video signals (at output terminal L) for appropriate intensity modulation of the electron beam of kinescope 10, as well as to provide suitable synchronizing pulse information (at terminals $P_1$ and $P_2$) to synchronize, in respective horizontal and vertical deflection circuits 13 and 14, the energization of the respective horizontal and vertical windings 15 and 16 of the deflection yoke associated with kinescope 10.

In vertical deflection circuit 14, synchronizing signals are applied via terminal $P_2$ and the series combination of resistor 18 and capacitor 20 to the control grid (input electrode) of a pentode output amplifying stage 22. Output stage 22 comprises cathode and anode electrodes and a control grid, a screen grid and a suppressor grid disposed in the named order between the cathode and anode. A resistor 23 is coupled between the cathode of output stage 22 and ground. The anode (output electrode) of output stage 22 is coupled by means of the primary winding 24*a* of a vertical output transformer 24 to a source of direct voltage (B+). The screen grid of output stage 22 is connected directly to a second source of direct voltage (E). A feedback network comprising the series combination of a resistor 26, a capacitor 28 and a vairable resistance linearity control 30 is coupled between the anode of output stage 22 and the suppressor grid which is connected in common to the anode electrode 32 of a diode which may be constructed within the same envelope as output stage 22. The cathode of output stage 22, as is shown, also serves as the cathode for the diode anode 32. A compensated voltage source comprising a resistor 34 and a voltage dependent resistor (VDR) 36 is coupled between the B+ supply and ground. The compensated voltage provided at the junction of resistor 34 and VDR 36 is coupled to a variable resistance height control 38, which, in turn, is coupled by means of a resistor 40 to the feedback network at the junction of linearity control 30 and the suppressor grid of output stage 22. A bias voltage developed at this last-named junction is coupled by means of a resistor 42 to the control grid of output stage 22.

A modified sawtooth voltage waveform is also applied via coupling capacitor 44 to the control grid of output stage 22. The modified sawtooth voltage waveform is produced across capacitor 46, one end of which is coupled to cathode resistor 23 and the other end of which is coupled by means of a charging resistor 48 to the compensated voltage source provided at the junction of resistor 34 and VDR 36.

An NPN transistor oscillator of switching stage 50 comprising a base electrode 50*b*, a collector electrode 50*c* and an emitter electrode 50*e* is provided for discharging capacitor 46. The collector 50*c* is coupled to the junction of resistor 48 and capacitor 46 while the emitter 50*e* is coupled to ground. The base electrode 50*b* is provided with a triggering waveform derived from the secondary winding 24*b* of output transformer 24. The triggering waveform is derived by means of integrating network 52 and capacitors 54 and 56 in conjunction with resistor 58 and a variable resistance hold control 60.

The vertical deflection winding 16 is coupled by means of terminals V, V′ across the secondary winding 24*b* of vertical output transformer 24.

Referring to FIGURE 2 in connection with FIGURE 1, the operation of vertical deflection circuit 16 now will be described. Each vertical deflection cycle comprises a relatively long duration trace portion and a relatively short duration retrace portion, the vertical deflection cycle recurring at a nominal rate of, for example, 60 times per second.

In vertical deflection circuit 16, a substantially sawtooth voltage waveform (FIGURE 2, waveform A) is produced across capacitor 46 by means of alternate charging, via the path including resistors 48 and 23, from the compensated voltage supply provided by resistor 34 and VDR 36 coupled across the B+ supply and discharging through the path including resistor 23 and the collector-emitter circuit of transistor 50. In some application, resistor 23 may not be needed, in which case capacitor 46 would be returned to ground along with the cathode of output stage 22. However, if resistor 23 is used, improved linearity is obtained by arranging the circuit as in FIGURE 1. The sawtooth voltage waveform A is coupled, after removal of the direct component thereof by means of capacitor 44, to the control grid of output stage 22. Anode current variations which are produced in output stage 22 as a result of the voltage applied to the control grid thereof pass through transformer primary winding 24*a* and, after modification by the turns ratio of transformer 24, are coupled to deflection winding 20 by means of secondary winding 24*b*.

During the trace portion of each deflection cycle, the anode current in output stage 22 increases relatively linearly causing the anode voltage to decrease in a similar manner (waveform B). At the end of trace, a negative polarity vertical synchronizing pulse is applied via resistor 18 and capacitor 20 to the control grid of output stage 22, tending to render stage 22 non-conductive. The negative synchronizing pulse is inverted and amplified by output stage 22 and the amplified pulse is coupled via transformer 24, integrating network 52 and capacitor 54 to the base 50*b* of transistor 50. Transistor 50 is thereby driven into conduction, discharging capacitor 46 and rendering the voltage applied to the control grid of output stage 22 still more negative. The output stage 22 is driven rapidly into cutoff while the anode voltage (waveform B) increases rapidly (e.g. by more than 1000 volts) as a result of the energy stored in the inductive components including transformer 24 and deflection windings 16. The increasing retrace anode voltage waveform is of the correct polarity to produce conduction in the unidirectionally conductive feedback circuit including resistor 26, capacitor 28, linearity control 30, the diode formed by anode 32 and the cathode of output stage 22, and cathode resistor 23. Capacitor 28 therefore charges relatively rapidly, the charging rate, and thereby the voltage level which is attained by the end of retrace, being adjustable by means of linearity control 30. Near the end of retrace, as the anode voltage of stage 22 decreases, the voltage developed by integrating network 52 and capacitors 54 and 56 which is applied to the base 50*b* of transistor 50 also decreases and turns the transistor 50 "off" (non-conductive). Capacitor 46 then commences recharging to initiate the next deflection cycle.

The charging of capacitor 28 during retrace and the discharging thereof during trace results in the production of the solid line voltage waveform C at the junction of resistors 40 and 42 with respect to ground. As is shown in waveform C, the decrease in anode voltage of stage 22 at the start of trace combined with the voltage produced across capacitor 28 as a result of the charge stored during retrace results in a negative average voltage at the junction of resistors 40 and 42 during trace. A substantial portion of this negative average voltage is coupled by means of resistor 42 to the control grid of output stage 22 to serve as the grid bias supply for output stage 22. The magnitude of the grid bias is dependent upon the discharging rate of capacitor 28 during trace and may be varied, as will be explained below, by means of height control 38. The portion of waveform C occurring at the beginning of trace is utilized to provide linearity control in the following manner. As is shown by the dotted lines (*a*) and (*b*) in waveform C, variation of the linearity control 30 primarily causes an increase or decrease in the portion of waveform C occurring at the beginning of trace. That is, linearity control 30 provides a means for controlling the charging of capacitor 28 during retrace and therefore for controlling the negative voltage level appearing at the junction of resistors 40 and 42 at the beginning of trace. In waveform C, dotted line (*a*) corresponds to a setting of minimum resistance of linearity control 30 (maximum charging of capacitor 28) and would result in a compression of the top of the image (beginning of vertical trace) produced on cathode ray tube 10. As is shown by the corresponding dotted line (*a*) in waveform D, the voltage applied to the control grid of output stage 22 is of lower value during the first portion of trace, causing the compression of the top of the image. Conversely, when linearity control 30 is set for maximum resistance (minimum charging of capacitor 30) the dotted lines labelled (*b*) in waveforms C and D are produced. In that case, the top of the image produced on cathode ray tube 10 will be stretched at the top. Under normal conditions, linearity control 30 need only be adjusted over a relatively small range and the variations in waveforms C and D would be substantially less than that illustrated. It can be seen from waveform C that variation of linearity control 30 affects substantially only the initial portion of vertical trace and, for the normal operating range, has very little effect on the D-C level of the voltage applied to the control grid of stage 22. Linearity control 30 therefore has, for all practical purposes, substantially no effect on the height or size of the image produced on cathode ray tube 10.

At the same time, variation of height control 38 varies the rate at which capacitor 28 discharges during trace. That is, the discharging slope of waveform C during trace is decreased as the resistance of height control 38 is increased, causing an increase in bias and a descrease in height. Conversely, as the resistance of height control 38 is decreased, capacitor 38 discharges more rapidly, the bias applied to output stage 22 decreases and the height of the image displayed on cathode ray tube 10 increases. Variation of height control 38 has relatively little effect on the shape of waveform C during the initial portion of trace and therefore has little or no effect on linearity. In a practical embodiment of the invention, the resistance value of height control 38 preferably is selected substantially larger than that of linearity control 30 (e.g. ten times) to further minimize the effect of one on the other.

In accordance with a further aspect of the present invention, the series combination of resistor 34 and VDR 36 is coupled across the B+ supply and supplies, at the junction of resistor 34 and VDR 36, a compensated supply voltage towards which capacitor 46 charges and capacitor 28 discharges. Resistor 34 and VDR 36 are arranged to provide relatively small variations in the compensated supply voltage as line voltage changes, the permissible variations being selected to maintain image height substantially constant as line voltage and the high voltage supplied to cathode ray tube 10 vary.

Various modifications may be made in the circuit shown in FIGURE 1 without departing from the scope of the present invention. For example, positive synchronizing signals may be applied directly to base electrode 50*b* to synchronize the operation of the circuit. In some applications, the height control 38 may be returned to the anode electrode of output stage 22. Furthermore, while there are advantages in utilizing a transistor oscillator 50, a number of advantages associated with the illustrated embodiment may be retained when using a triode vacuum tube as the oscillator stage. Similarly, an external feedback diode may be used in place of the internal diode including anode 32.

What is claimed is:

1. In a television receiver having a cathode ray image-reproducing tube and an electromagnetic deflection yoke for said tube including vertical deflection windings, a vertical deflection circuit comprising in combination:

circuit means including a first capacitor for developing a recurring sawtooth voltage waveform, an amplifying device having an input electrode and an output electrode, means for coupling said circuit means to said input electrode, means for coupling said output electrode to said vertical deflection windings for supplying deflection current to said windings and for developing vertical retrace voltage pulses at said output electrode, unidirectionally conductive feedback means comprising the series combination of a second capacitor and a substantially unidirectionally conductive device coupled to said output electrode for charging said second capacitor during the retrace portion of each vertical deflection cycle, a source of direct voltage, discharging circuit means for coupling said second capacitor to said source, and means for direct coupling said feedback means to said input electrode.

2. In a television receiver, a vertical deflection circuit according to claim 1 wherein said feedback means further comprises a variable resistance linearity control.

3. In a television receiver, a vertical deflection circuit according to claim 2 wherein said uni-directionally conductive device comprises a diode poled to conduct in response to the occurrence of said retrace voltage pulses.

4. In a television receiver, a vertical deflection circuit according to claim 3 wherein said discharging circuit means comprises a variable resistance height control.

5. In a televisoin receiver, a vertical deflection circuit according to claim 4 wherein the maximum resistance value of said height control is substantially greater than the maximum resistance value of said linearity control.

6. In a television receiver, a vertical deflection circuit according to claim 4 wherein said source of direct voltage is of a polarity to produce conduction in said amplifying device upon application thereof to said input electrode.

7. In a television receiver, a vertical deflection circuit according to claim 6 wherein said source of direct voltage includes a voltage divider comprising the series combination of a fixed resistor and a voltage dependent resistor proportioned to maintain image height on said cathode ray tube substantially constant as said direct voltage changes.

8. In a television receiver, a vertical deflection circuit according to claim 6 wherein said means for direct coupling said feedback means to said input electrode comprises a resistor and said means for coupling said circuit means including a first capacitor to said input electrode comprises a third capacitor.

9. In a television receiver, a vertical deflection circuit according to claim 8 and further comprising switching means coupled across said first capacitor for discharging said first capacitor during the retrace portion of each vertical deflection cycle.

10. In a television receiver, a vertical deflection circuit according to claim 9 wherein said switching means comprises a transistor.

11. In a television receiver a vertical deflection circuit according to claim 9 and further comprising means for coupling said first capacitor to said source of direct voltage.

12. In a television receiver, a vertical deflection circuit according to claim 10 wherein said means for coupling said output electrode to said deflection windings comprises a transformer, said deflection circuit further comprising means for coupling said transistor to said transformer for rendering said transistor conductive during the retrace portion of each vertical deflection cycle.

13. In a television receiver, a vertical deflection circuit according to claim 12 wherein said amplifying device comprises a pentode vacuum tube having an anode output electrode and a control grid input electrode.

14. In a television receiver having a cathode ray image-reproducing tube and an electromagnetic deflection yoke for said tube including vertical deflection windings, a vertical deflection circuit comprising in combination:

circuit means including a first capacitor for developing a recurring sawtooth voltage waveform, an amplifying device having an input electrode, an output electrode, and a common electrode, means for coupling said circuit means between said input and common electrodes, means for coupling said output and common electrodes to said vertical deflection windings for supplying deflection current to said windings and for developing vertical retrace voltage pulses at said output electrode, means including a second capacitor, a variable resistance device and a rectifier coupled between said output electrode and the said common electrode, said rectifier being poled for conduction in response to said vertical retrace voltage pulses for charging said second capacitor, a discharge circuit for said second capacitor including a second variable resistance device and said first variable resistance device, means providing a direct current connection between said input electrode and a point on said discharge circuit.

No references cited.

RODNEY D. BENNETT, *Primary Examiner.*

J. G. BAXTER, *Assistant Examiner.*